(12) United States Patent
Feldman

(10) Patent No.: US 7,937,273 B2
(45) Date of Patent: May 3, 2011

(54) CHANGE COLLISION CALCULATION SYSTEM AND METHOD

(75) Inventor: Nir Feldman, Kfar Harif (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 348 days.

(21) Appl. No.: 12/239,756

(22) Filed: Sep. 27, 2008

(65) Prior Publication Data

US 2009/0147687 A1    Jun. 11, 2009

Related U.S. Application Data

(60) Provisional application No. 61/012,255, filed on Dec. 7, 2007.

(51) Int. Cl.
*G06Q 10/00* (2006.01)
(52) U.S. Cl. ........................................ 705/1.1
(58) Field of Classification Search .................. 705/1.1
See application file for complete search history.

(56) References Cited

U.S. PATENT DOCUMENTS

| | | | |
|---|---|---|---|
| 5,642,360 A * | 6/1997 | Trainin | 370/230 |
| 6,226,652 B1 | 5/2001 | Percival | |
| 7,213,175 B2 | 5/2007 | Morrison | |
| 2004/0024820 A1 * | 2/2004 | Ozzie et al. | 709/205 |
| 2005/0138014 A1 | 6/2005 | Bhasker | |
| 2005/0166094 A1 | 7/2005 | Blackwell | |
| 2005/0193381 A1 | 9/2005 | Hellerstein | |
| 2006/0165024 A1 * | 7/2006 | Iwami et al. | 370/315 |
| 2006/0173850 A1 * | 8/2006 | Auer et al. | 707/10 |
| 2007/0022407 A1 | 1/2007 | Givoni | |
| 2007/0074157 A1 | 3/2007 | Worden | |
| 2007/0157161 A1 | 7/2007 | Shaburov | |
| 2007/0169124 A1 | 7/2007 | Kershenbaum | |
| 2008/0150674 A1 * | 6/2008 | Park et al. | 340/3.41 |
| 2009/0177710 A1 * | 7/2009 | Holenstein et al. | 707/201 |
| 2009/0196270 A1 * | 8/2009 | Iwai et al. | 370/342 |

* cited by examiner

*Primary Examiner* — Jonathan Ouellette

(57) ABSTRACT

A method of performing a change collision calculation and corresponding system are described. The method comprises: determining a collision information change based on receipt of a change request. For each determined collision information change, the method comprises determining a cause of a collision based on the collision information and the change request, and determining a severity of the collision. The method also comprises ordering the collision information based on the severity, and storing the ordered collision information to a memory.

14 Claims, 5 Drawing Sheets

`US 7,937,273 B2`

CHANGE COLLISION CALCULATION SYSTEM AND METHOD

CROSS REFERENCE TO RELATED APPLICATIONS

This Application claims the benefit of U.S. provisional patent application Ser. No. 61/012,255, filed Dec. 7, 2007, titled "Change Collision Calculation System And Method", which application is hereby incorporated by reference herein as if reproduced in full below.

BACKGROUND

Organization change managers face the problem of approving one or more changes every week. When approving a change, the approver must decide how risky the change is and what the change will affect. Two changes affecting the same configuration item (e.g., database schema, computer system capability) at the same time, may result in a downtime of critical applications and loss of money to the organization due to the colliding changes.

One prior solution of some organizations entailed a meeting where all involved personnel were requested to identify problems related to a requested change. The meeting approach is time consuming and ineffective.

Anther prior solution entailed generating a report from a service desk identifying change collisions. This approach is both time consuming (the report generation takes a lot of time) and not updated on each updated change.

Information technology (IT) organizations face the problem of approving change requests in production environments. In big organizations, there might be more than 100,000 changes every year (on the order of almost 300 changes per day). The change manager needs to approve all the changes. It is difficult, if not impossible, for the change manager to detect whether a certain change request collides with other changes manually.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
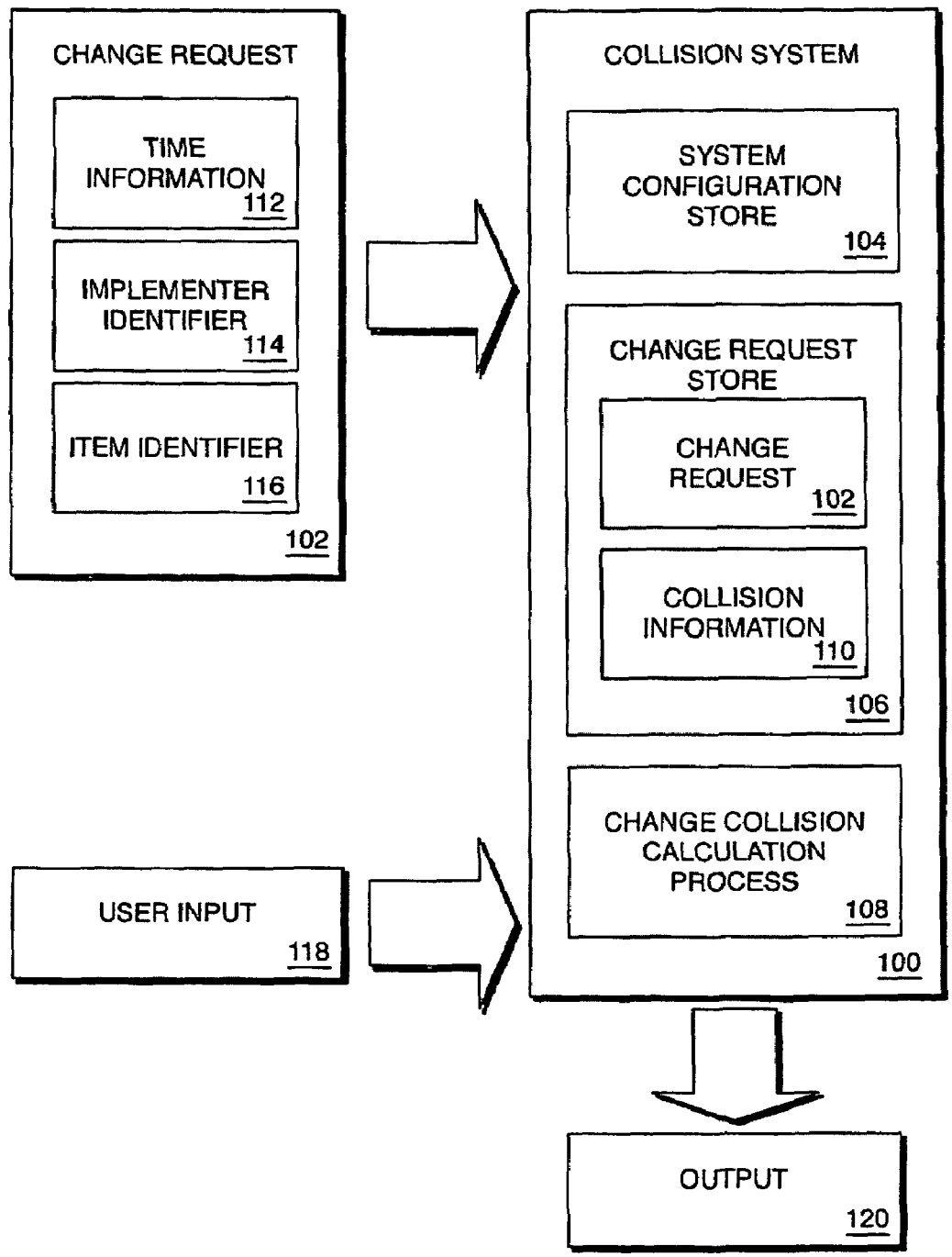
FIG. 1 is a high-level functional block diagram of a change collision calculation system according to an embodiment.

FIG. 1 depicts a high-level functional block diagram of a change collision calculation (CCC) system 100 according to an embodiment. CCC system 100 responds to receipt of a submitted change request 102 by determining whether and to what severity the change request collides with other change requests and/or impacts other collisions. CCC system 100 comprises a system configuration store 104 for storing configuration information related to a particular system to which the change collision calculation applies, a change request store 106 for storing received change requests (such as change request 102), and a change collision calculating process 108 for performing a method according to an embodiment.

System configuration store 104 stores a configuration of a system, e.g., a computer, a network, an organization, an enterprise, etc. In at least some embodiments, system configuration store 104 comprises information about hardware and/or software items.

Change request store 106 comprises a change request 102 corresponding to a received change request and a collision information item 110 for storing collision information.

Change request 102 comprises a time information item 112 for storing time-related information of the change request (such as start time, end time, and/or a duration), an implementer identifier 114, and an item identifier 116 for storing an identifier of an item of system configuration store 104 to which the change request relates.

In at least some embodiments, time information item 112 comprises a start time specifying a planned time at which the requested change will start and at least one of either an end time specifying a planned time at which the requested change is predicted to end or a duration specifying a planned duration of the requested change.

Implementer identifier 114 corresponds to a person and/or organization responsible for implementing the particular change requested. For example, an implementer may be responsible for performing a software and/or hardware based change.

Item identifier 116 corresponds to an item subject to the change request, e.g., a software and/or a hardware item. For example, a software item may comprise one or more sets of executable and/or interpretable instructions and a hardware item may comprise one or more processing devices, networking devices, cables, monitors, etc. to a level of detail recorded in the system configuration store 104.

In at least some embodiments, item identifier 116 comprises a changed configuration identifier (CCI) corresponding to a configuration item which is changed as a direct result of a change request and an affected configuration item (ACI) corresponding to a configuration item which is not directly involved in the change request, but may be affected as a result of the change. For example, a change request involving increasing memory on a server may be a CCI, but another machine connected to the server, but not directly involved in the change, is referred to as an ACI. In at least some embodiments, item identifier 116 comprises a directly affected application (DM) corresponding to a configuration item associated with an application, i.e., set of instructions, identified in the system configuration store 104 and an indirectly affected application (IM) corresponding to a configuration item associated with an application which is indirectly affected by a DAA change.

CCC system 100 also responds to receipt of user input 118 by determining an output 120 to be provided to a user, e.g., displayed, printed, stored, etc.

Figure 2:
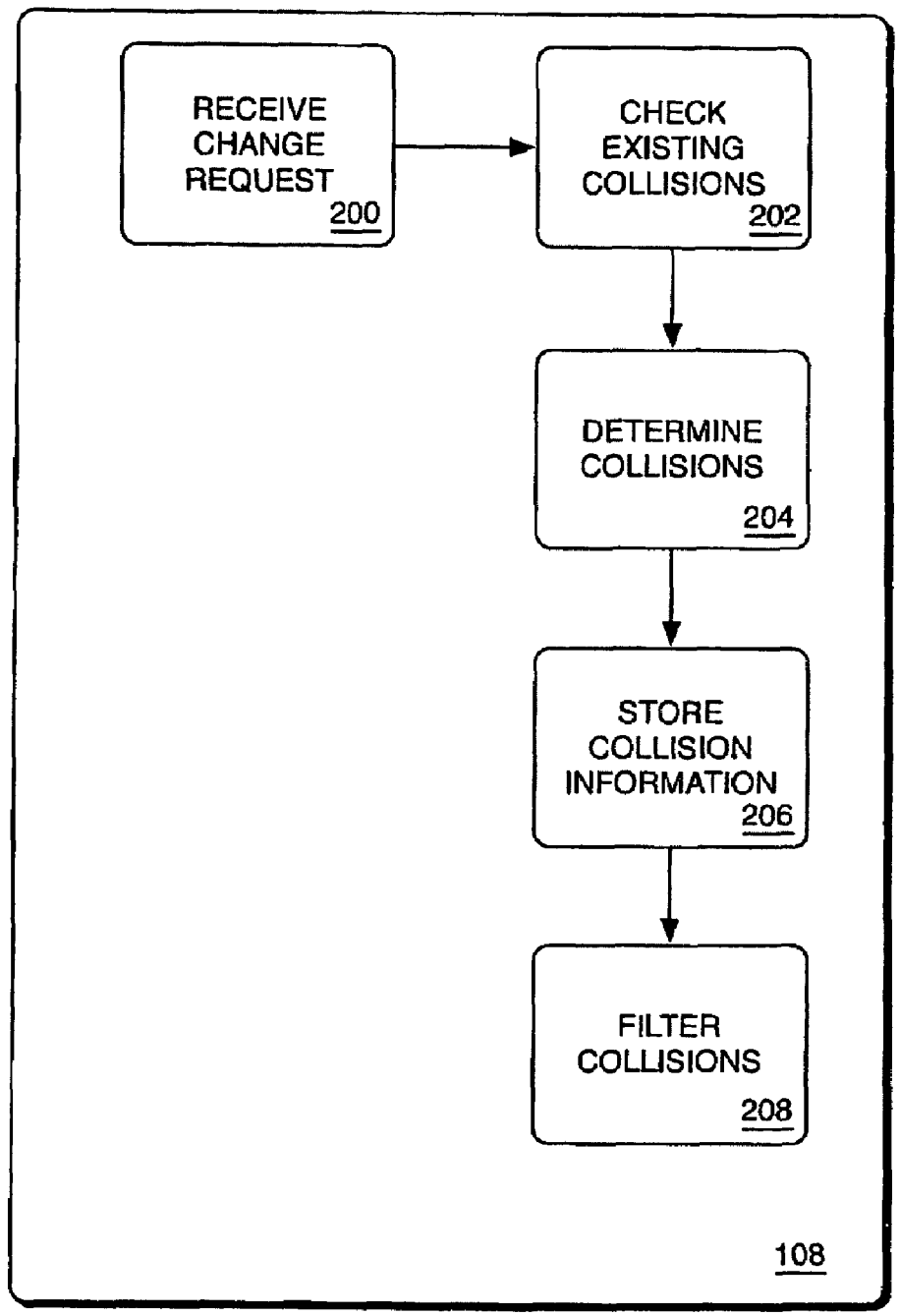
FIG. 2 is a high-level functional process flow diagram of a change collision calculation process according to an embodiment.

FIG. 2 depicts a high-level functional process flow diagram of change calculation process 108 according to an embodiment. The process flow begins at change request functionality 200 wherein CCC system 100 receives a change request, e.g., change request 102. The flow proceeds to collision check functionality 202 wherein collision information 110, i.e., existing collisions, in change request store 106 are checked to determine if any changes to the data has occurred. Data checked for changes comprises time information 112, e.g., start time, end time, etc., implementer identifier 114, and item identifier 116.

The flow proceeds to determine collisions functionality 204 wherein if one or more data changes are detected, change requests colliding with the detected change are determined. That is, overlapping change requests are determined. In at least some embodiments, the cause of the collision is determined, along with a severity of the collision, and the collisions related to a particular change request are ranked and the worst severity information is stored with the change request.

The flow proceeds to store collision information 206 wherein the determined collisions are stored in collision information 110. In at least some embodiments, the data corresponding to the change requests and collisions are stored as a graph structure wherein nodes of the graph correspond to change requests and an edge connecting two nodes indicates a collision between two change requests. The edge comprises the collision cause information and the collision severity.

The flow proceeds to filter collisions functionality 208 Wherein collision information 206 corresponding to collisions between change requests which are no longer valid, e.g., because of changed requests such as time, implementer, and/or item, are removed from collision information 206.

Figure 3:
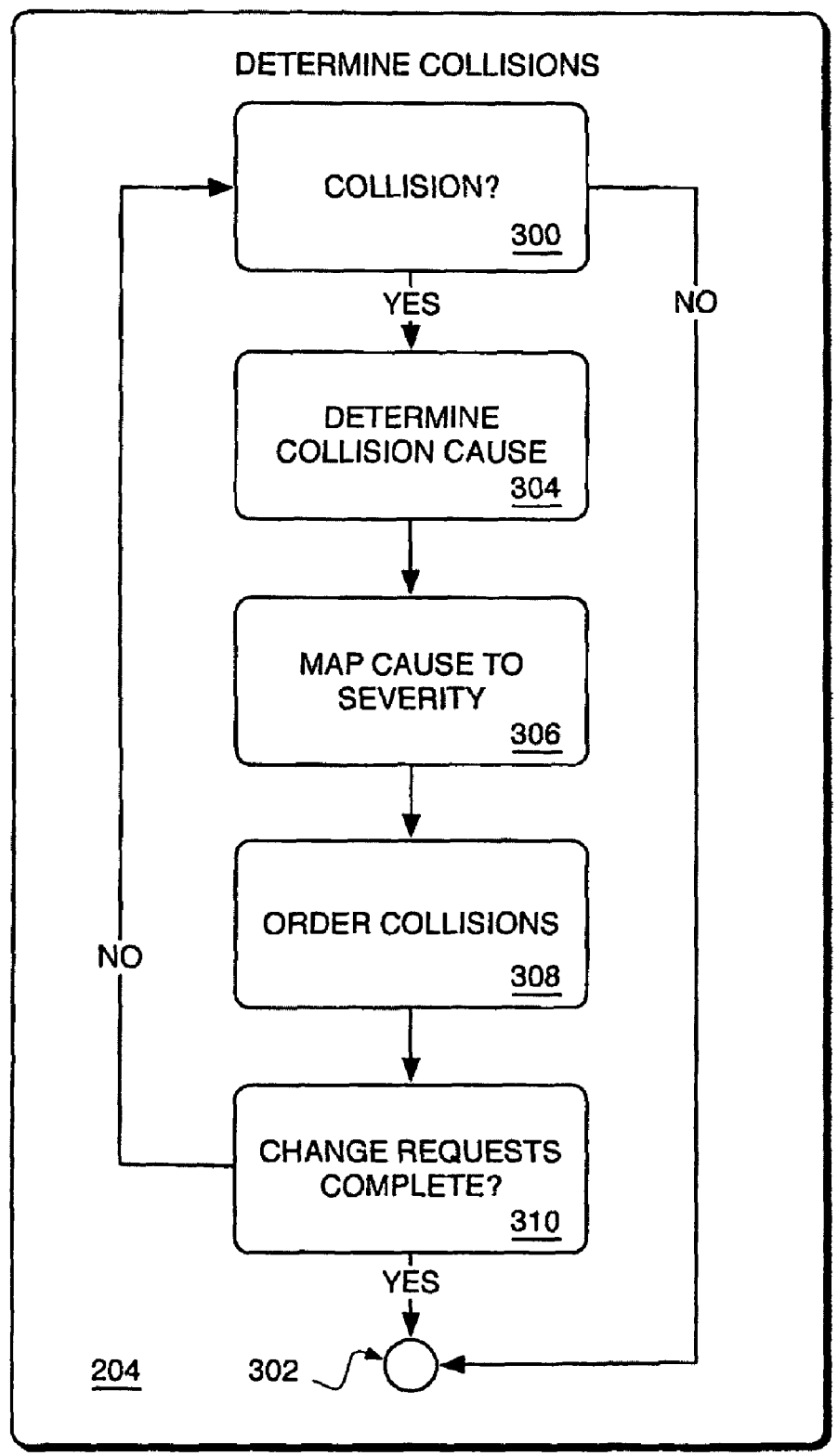
FIG. 3 is a high-level functional process flow diagram of a determine collisions process according to an embodiment.

Determine collisions functionality 204 is examined in more detail. FIG. 3 depicts a high-level process flow diagram of determine collisions functionality 204 according to an embodiment. The process flow begins at collision query functionality 300 wherein a collision is determined based on a received change request 102 and/or a detected data change to an existing change request and/or collision stored in change request store 106. If the result of collision query functionality 300 is negative ("NO"), the flow proceeds to the end of determine collisions functionality 204. If the result of collision query functionality 300 is positive ("YES"), the flow proceeds to cause determination functionality 304.

In at least some embodiments, collision query functionality 300 identifies change requests involving common configuration items which may be scheduled/planned to occur over the same or adjacent time periods. In at least some embodiments, change requests are said to collide when an application or configuration item is involved in more than one change over the same or adjacent time periods or when the same implementer is responsible for implementing more than one change over the same time period or adjacent time periods.

A proximity of two change requests may be determined as either overlapping or overlap warning. In an overlapping proximity, the two change requests have overlapping schedules. In an overlap warning proximity, the two change requests are scheduled within a predetermined proximity of each other. In at least some embodiments, the predetermined proximity for the overlap warning proximity comprises a time period during which a time gap between a first and second change request is shorter than 10% of the duration of the first change request.

Execution of cause determination functionality 304 causes CCC system 100 to determine the cause of a collision. For example, a collision may be caused based on an overlap of an implementer on a particular item, a collision may be caused based on an overlap of a change to a CCI item and an ACI item, etc. Column 1 of Table 1 depicts a listing of causes of collisions based on more than one change request.

TABLE 1

| Cause | Severity |
|---|---|
| CCI-CCI | Critical |
| CCI-ACI | High |
| ACI-ACI | None |
| DAA-DAA | High |
| IAA-DAA | Medium |
| IAA-IAA | Low |
| Implementor | Medium |

The flow proceeds to severity determination 306 wherein, based on the cause of the collision, the severity of the collision is determined. Column 2 of Table 1 depicts a listing of corresponding collision severity for particular collision causes.

The flow proceeds to collision ordering functionality 308 wherein collisions are ordered based on severity and the most severe collision severity is assigned to the received change request 102.

The flow proceeds to change request completion functionality 310 wherein CCC system 100 determines whether the handling of determined collisions is complete, I.e., have all colliding change requests been handled. If the result of functionality 310 is positive ("YES"), the flow proceeds to the end of determine collisions functionality 204. If the result of functionality 310 is negative ("NO"), the flow returns to collision query functionality 300.

Figure 4:
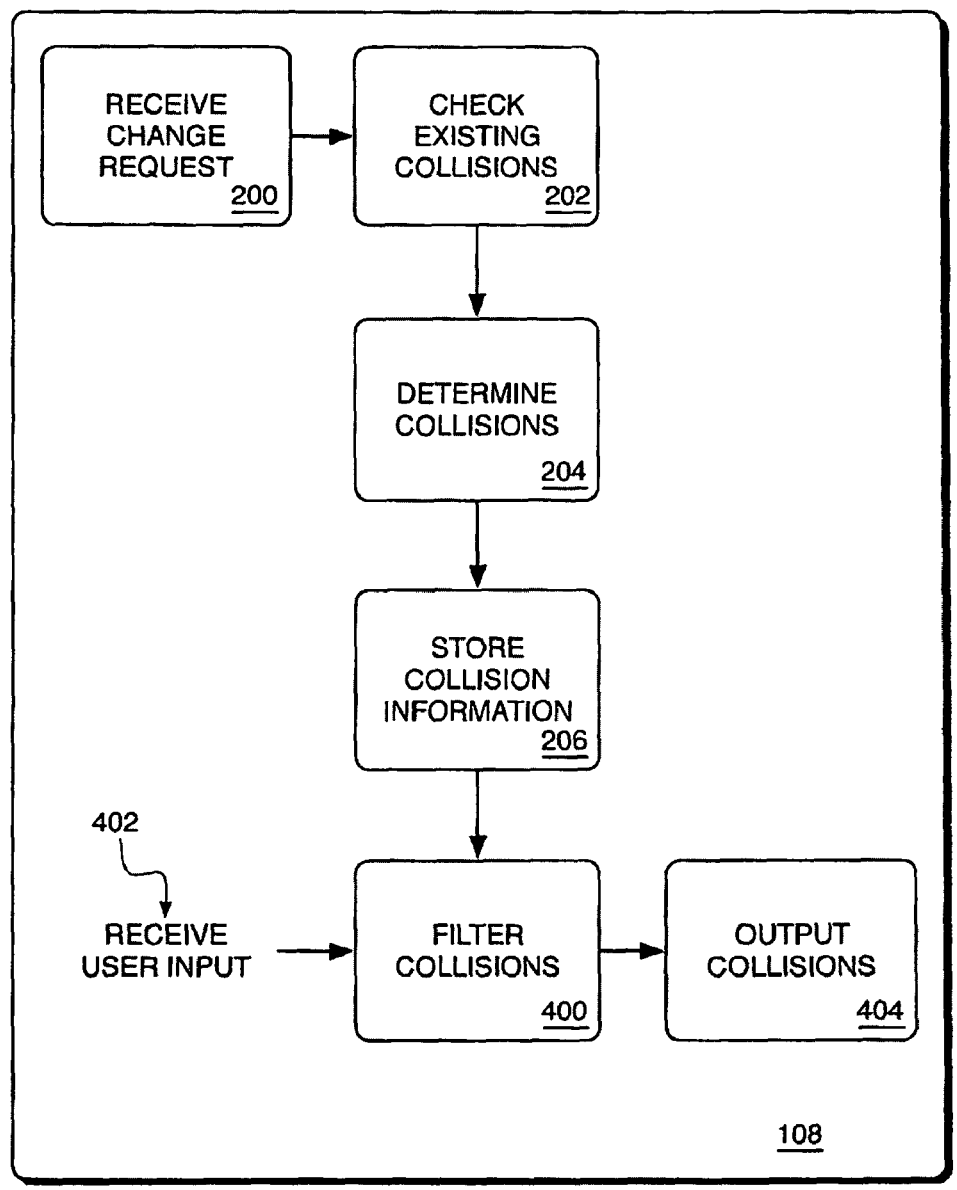
FIG. 4 is a high-level functional process flow diagram of a change collision calculation process according to another embodiment.

FIG. 4 depicts a high-level functional process flow diagram of a change collision calculation process according to another embodiment wherein filter collisions functionality 400 replaces filter collisions functionality 208 wherein collision information 206 corresponding to collisions between change requests which are no longer valid, e.g., because of changed requests such as time, implementer, and/or item, are removed from collision information 206. Filter collisions functionality 400 also receives user input 402 in order to determine collision information to be provided to an output collisions functionality 404. In at least some embodiments, the received user input 402 may comprise user entered commands and/or information received by CCC system 100, e.g., a user-specified severity threshold level, a user-specified overlap proximity threshold level, a user-specified implementer and/or item information of interest, etc.

Responsive to receipt of user input 402, filter collisions 400 filters the determined collisions based on the user input to generate a set of collisions to provide to output collisions functionality 404. Output collisions functionality 404 outputs the received set of collisions to either a memory, storage device, display, printer, or other output device. In at least some embodiments, output collisions 404 may be used in conjunction with filter collisions functionality 206 to output a set of collisions.

Figure 5:
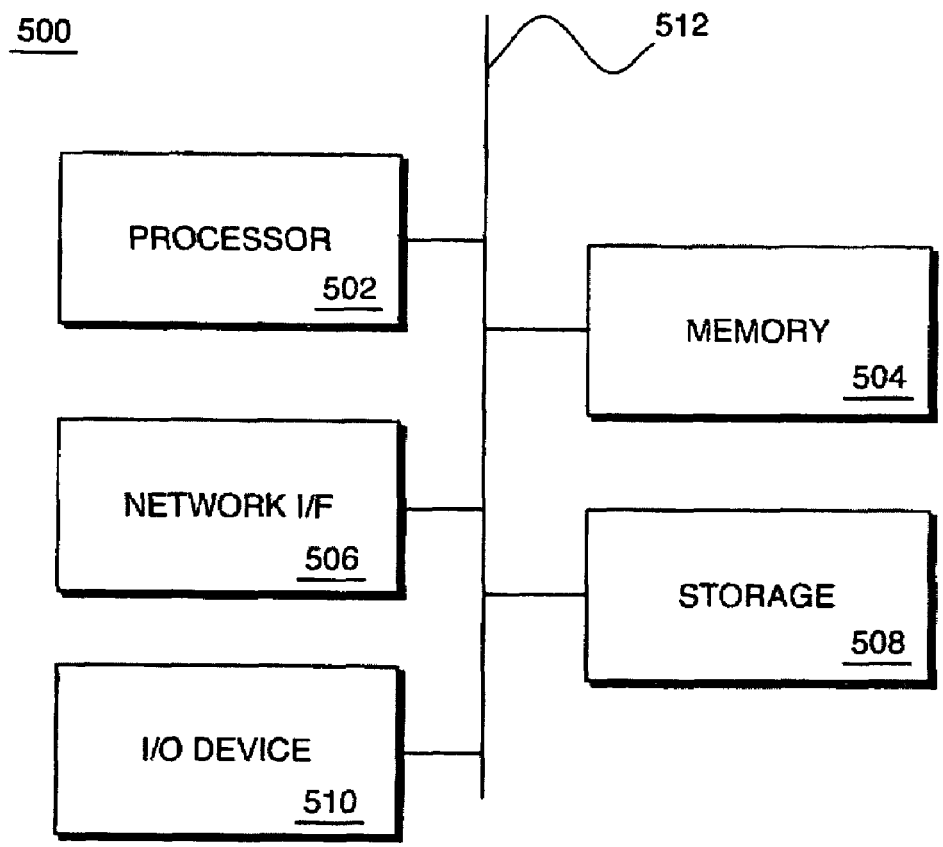
FIG. 5 is a high-level functional block diagram of a computer system usable in conjunction with the change collision calculation system according to an embodiment.

FIG. 5 depicts a high-level functional block diagram of a computer system 500 usable in conjunction with CCC system 100 according to an embodiment. Computer system 500 comprises a processor 502, a memory 504, a network interface (I/F) 506, a storage 508, and an input/output device 510 communicatively coupled via a bus 512 or other interconnection communication mechanism.

Memory 504 (also referred to as a computer-readable medium) may comprise a random access memory (RAM) or other dynamic storage device, coupled to the bus 512 for storing communication data, and instructions to be executed by processor 502, e.g., change collision calculation process 108. Memory 504 also may be used for storing temporary variables or other intermediate information during execution of instructions to be executed by processor 502. Memory 504 may also comprise a read only memory (ROM) or other static storage device coupled to the bus 512 for storing static information and instructions for the processor 502.

Network I/F 506 comprises a mechanism for connecting CCC system 100 to another device. In at least some embodiments, CCC system 100 may not comprise network I/F 506.

A storage device (storage 508), such as a magnetic disk or optical disk, may also be provided and coupled to the bus 512 for storing data such as system configuration store 104 and change request store 106, and instructions.

I/O device 510 may comprise an input device, an output device and/or a combined input/output device for enabling user interaction with CCC system 100. An input device may comprise, for example, a keyboard, keypad, mouse, trackball, trackpad, and/or cursor direction keys for communicating information and commands to processor 502. An output device may comprise, for example, a display, a printer, a voice synthesizer, etc. for communicating information to a user.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

What is claimed is:

1. A method of performing a change collision calculation comprising:
    determining, by a processor, a collision information change based on receipt of a change request, the change request relating to a change in configuration of a computing system, the collision information change relating to a change in a collision resulting from the change request, the collision relating to the change request in that the change request interferes with a prior change request as to the change in configuration of the computing system;
    for each determined collision information change:
        determining, by the processor, a cause of the collision based on the collision information and the change request;
        determining, by the processor, a severity of the collision;
        ordering, by the processor, the collision information based on the severity; and
        storing, by the processor, the ordered collision information to a memory.

2. The method as claimed in claim 1, wherein the determination of a collision information change comprises determining a collision based on a time period overlap of at least one of: (a) two or more change requests or (b) one or more change requests and one or more collisions.

3. The method as claimed in claim 1, wherein the determination of a collision information change comprises determining a collision based on a time period related to a change request within a predetermined proximity of at least one of another change request or a collision.

4. The method as claimed in claim 3, wherein the predetermined proximity corresponds to a time period between a first change request time and at least one of a second change request time or a second collision time.

5. The method as claimed in claim 3, wherein the predetermined proximity corresponds to a time period corresponding to 10% of the duration of the first change request.

6. The method as claimed in claim 1, further comprising:
    filtering, by the processor, the ordered collision information based on a user input.

7. The method as claimed in claim 6, wherein the filtering comprises displaying ordered collision information corresponding to collisions having a severity above a predetermined severity level.

8. The method as claimed in claim 6, wherein the filtering comprises displaying ordered collision information corresponding to collisions based on a time period related to a change request within a predetermined proximity of at least one of another change request or a collision.

9. The method as claimed in claim 6, wherein the filtering comprises displaying ordered collision information corresponding to overlap-warning based collisions.

10. A memory or a computer-readable medium storing instructions which, when executed by a processor, cause the processor to perform the method of claim 1.

11. A change collision calculation system for determining change collision calculations, comprising:
    a processor; and
    a memory storing a set of instructions which, when executed by the processor, cause the processor to determine a collision information change based on receipt of a change request;
    determining a cause of a collision based on the collision information and the change request for the determined collision information change, determining a severity of the collision based on the determined collision information change, ordering the collision information based on the severity of the collision, and storing the ordered collision information to a memory,
    wherein the change request relates to a change in configuration of a computing system, the collision information change relates to a change in the collision resulting from the change request, the collision relating to the change request in that the change request interferes with a prior change request as to the change in configuration of the computing system.

12. The change collision calculation system as claimed in claim 11, wherein the memory comprises a system configuration store and a change request store.

13. The change collision calculation system as claimed in claim 12, wherein the change request store comprises one or more received change requests and one or more collision information items.

14. The change collision calculation system as claimed in claim 13, wherein the received change request comprises at least one of a time information, an implementor identifier, or an item identifier.

* * * * *